Figure 1:
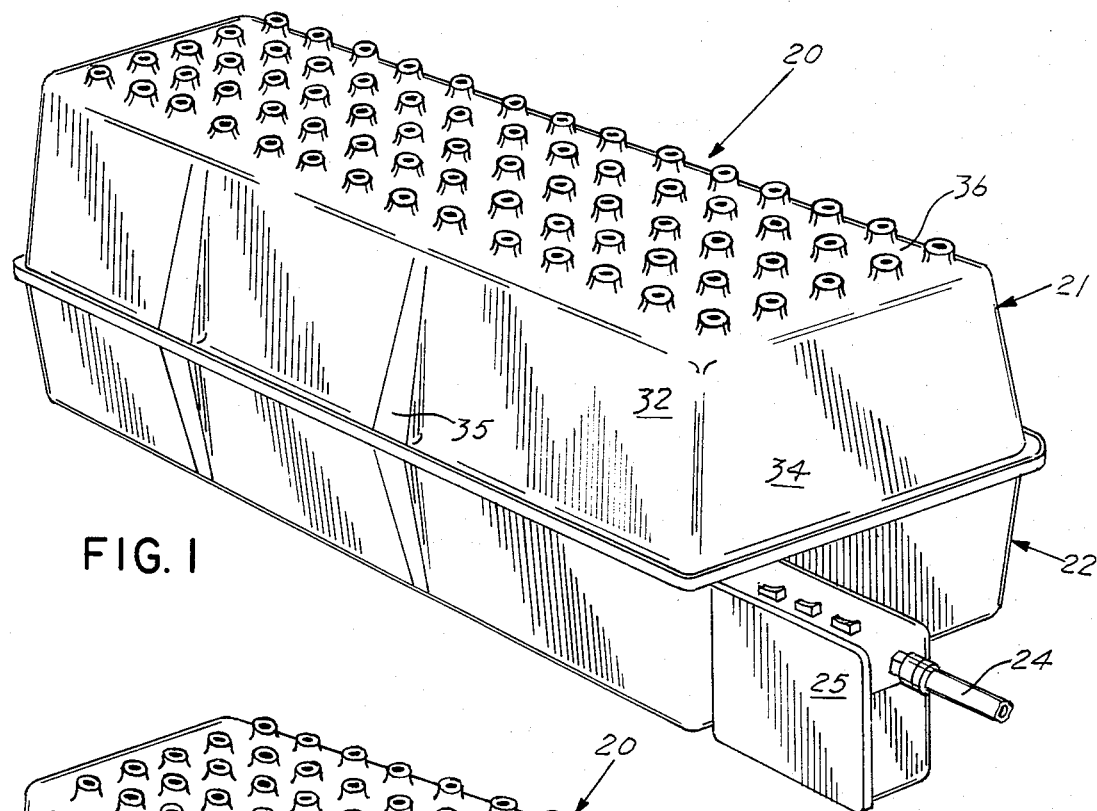
Figure 2:
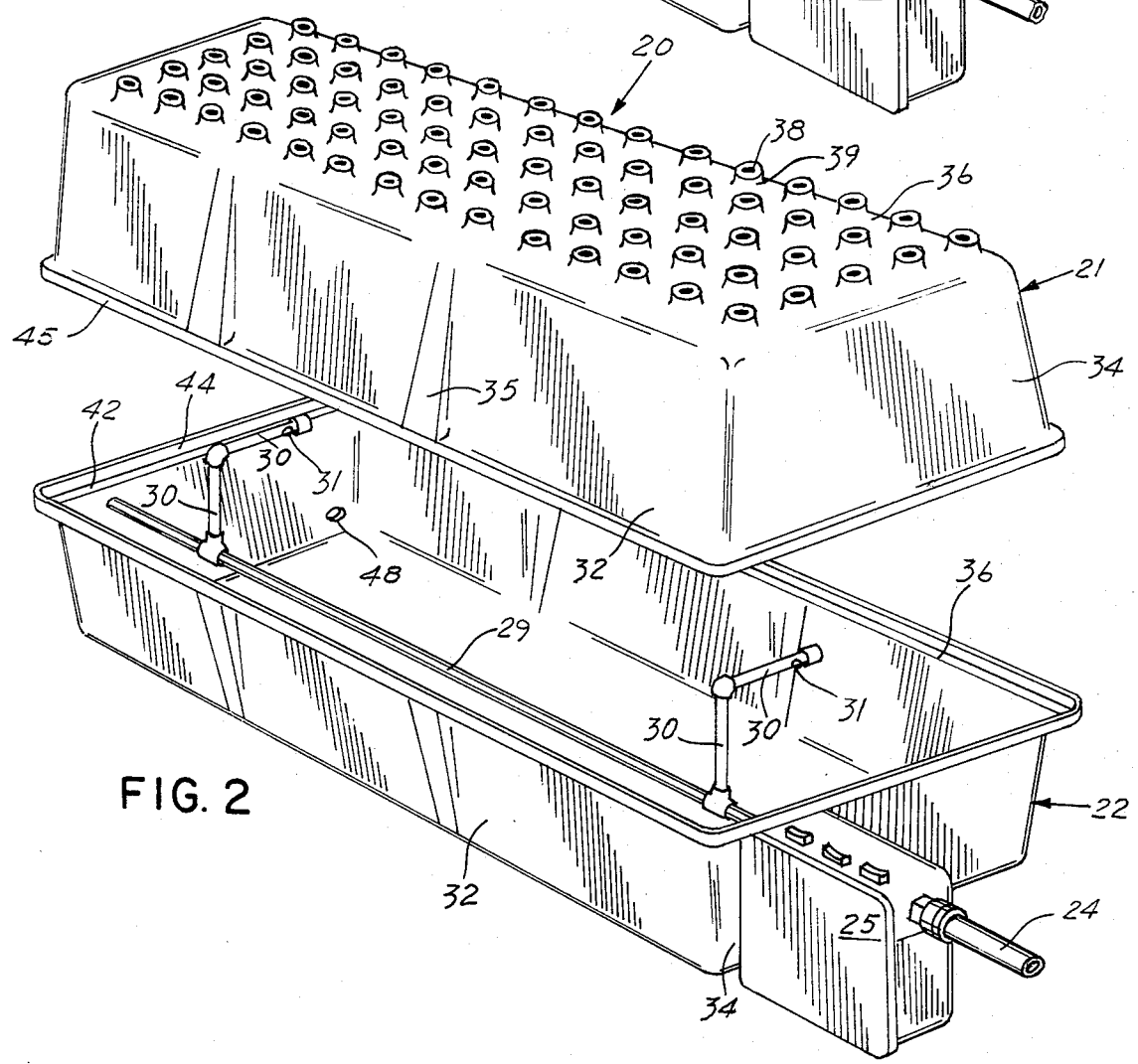
Figure 3:
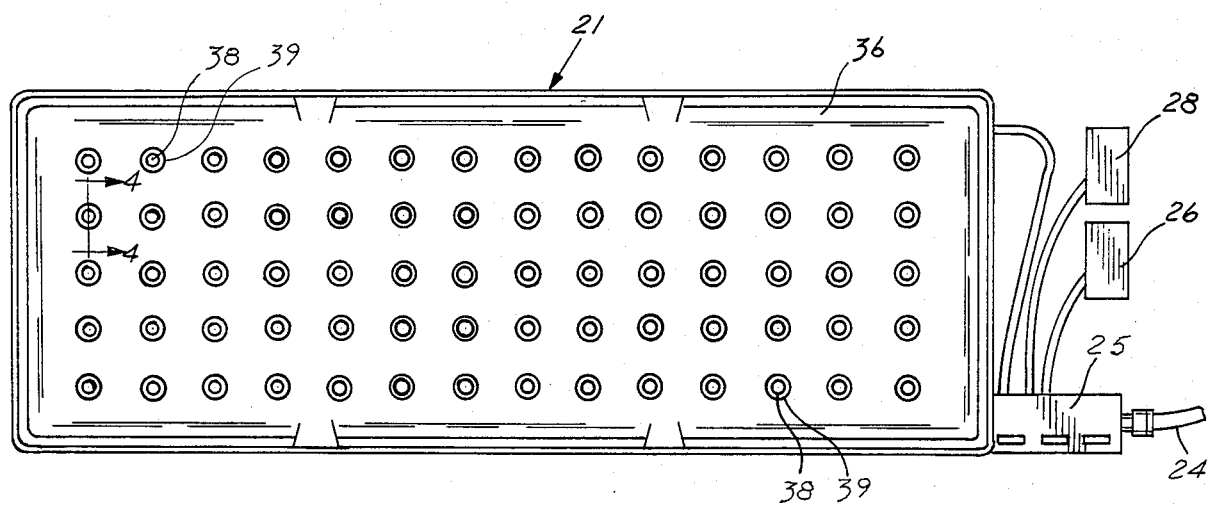
Figure 5:
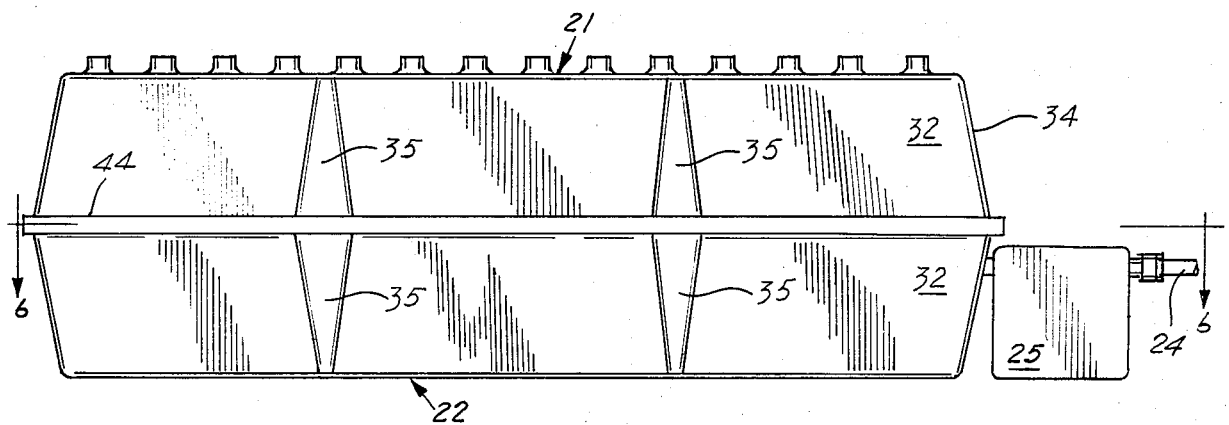
Figure 6:
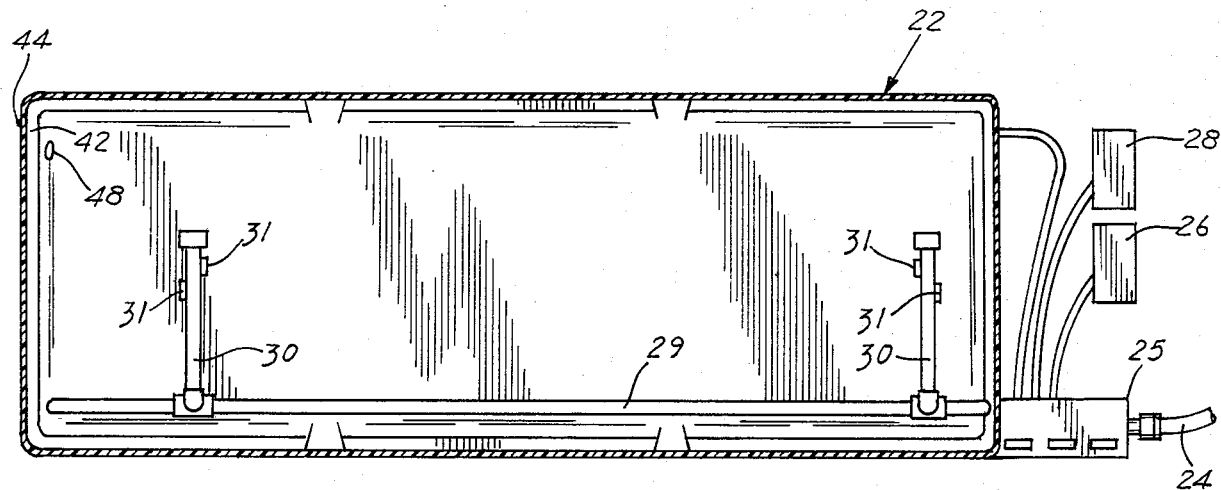
Figure 7:
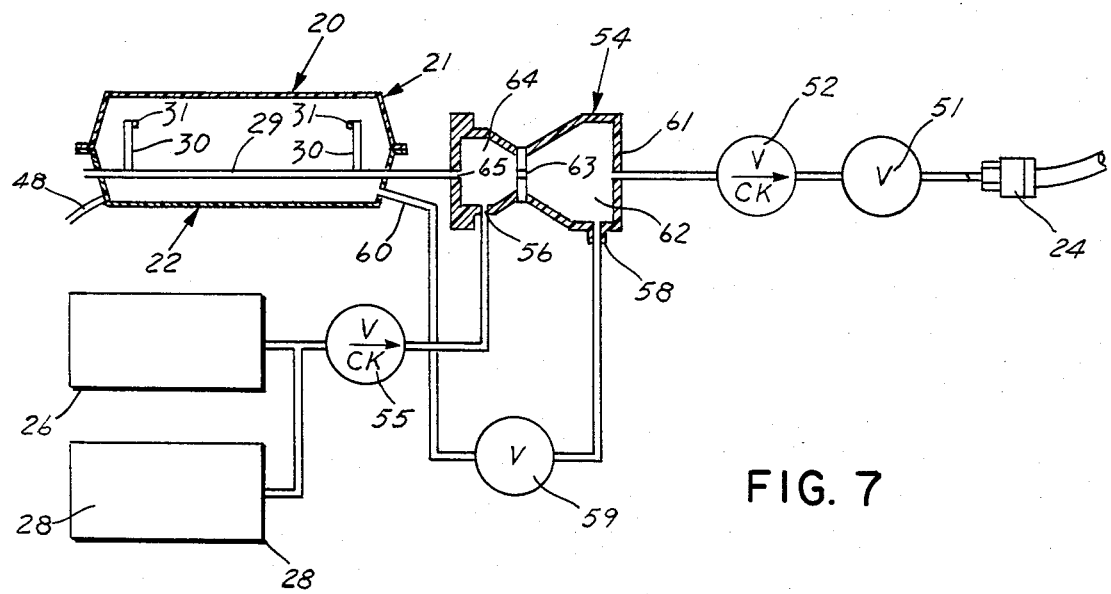
Figure 4:
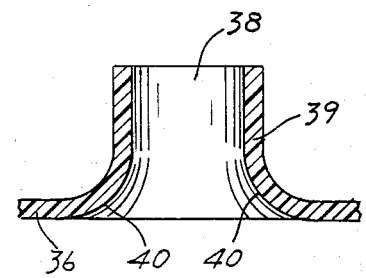
Figure 8:
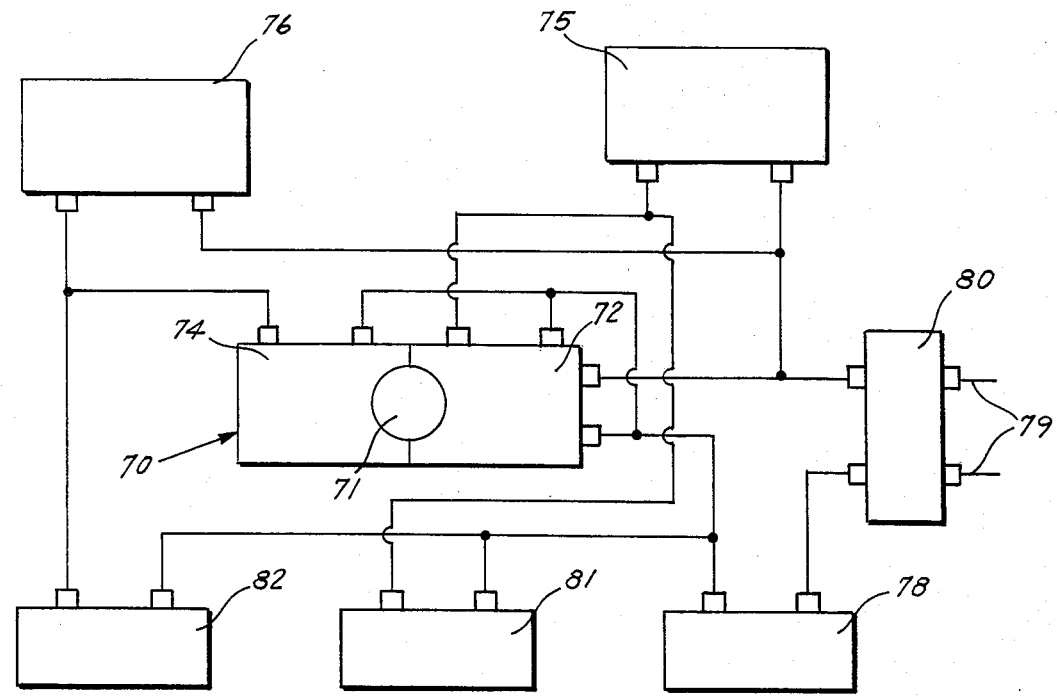

United States Patent [19]

Schorr et al.

[11] Patent Number: 4,514,930

[45] Date of Patent: May 7, 1985

[54] METHOD AND APPARATUS FOR AEROPONIC PROPAGATION OF PLANTS

[75] Inventors: Steven M. Schorr, Boulder; Richard J. Stoner, Jr., Longmont, both of Colo.

[73] Assignee: Genisis Technology, Inc., Boulder, Colo.

[21] Appl. No.: 455,989

[22] Filed: Jan. 6, 1983

[51] Int. Cl.³ ............................... A01G 31/00
[52] U.S. Cl. ............................... 47/60; 47/63
[58] Field of Search ............... 47/60, 62, 59, 63; 138/44

[56] References Cited

U.S. PATENT DOCUMENTS

| | | | |
|---|---|---|---|
| 3,158,524 | 11/1964 | Tong | 47/41 |
| 3,774,645 | 11/1973 | Pompa | 138/44 |
| 4,178,716 | 12/1979 | Harper et al. | 47/62 |
| 4,332,105 | 6/1982 | Nir | 47/62 |

Primary Examiner—Robert E. Bagwill
Assistant Examiner—Bradley M. Lewis
Attorney, Agent, or Firm—Ralph F. Crandell

[57] ABSTRACT

A method and apparatus for the propagation of plant cuttings under aeroponic conditions. An aqueous plant growth nutrient and hormone composition is applied as an intermittent hydro-atomized mist to plant cuttings suspended in an enclosed chamber. The aqueous composition is formed by mixing tap water at standard pressure, and a concentrated hormone, nutrient or other plant growth composition in a suction venturi, and directing the aqueous composition through a distributing manifold to mist nozzles. The venturi and distributing manifold are periodically drained to allow subsequent venturi suction and mixing. Timer controlled solenoid valves regulate the water flow and drain. Excess aqueous composition may be recirculated or discarded.

5 Claims, 8 Drawing Figures

METHOD AND APPARATUS FOR AEROPONIC PROPAGATION OF PLANTS

BACKGROUND OF THE INVENTION

1. Field of the Invention

The present invention relates to an improved method and apparatus for use in the propagation of plants under aeroponic conditions, and more specifically to a method and apparatus for providing an intermittent spray of an aqueous plant growth composition to a chamber as a hydro-atomized mist for inducing and promoting the growth of roots on plant cuttings and the like suspended within the chamber.

2. Description of the Prior Art

The propagation of plants, such as cuttings, in order to promote the development of root, stem and leaf structures, in a closed chamber while subjecting the plant to an aqueous mist containing such additives as nutrients, fertilizers, and other growth promoting compositions, is an old and well-known procedure. See for example U.S. Pat. No. 2,431,890 issued Dec. 2, 1947, to M. A. Raines for "Method and Receptacle for Propagating Plants." More recently, a method and apparatus for the aeroponic propagation of plants is disclosed in U.S. Pat. No. 4,332,105 issued June 1, 1982, to I. Nir for "Apparatus and Method for Plant Growth in Aeroponic Conditions." The patent to Nir describes a method and apparatus in which plants are supported by a support member above the root portions thereof and the root portions are subjected to a nutrient mist directed thereto, with control and timing means for controlling the time and sequence of application of the mist. Nir utilizes a high pressure pump or pneumatic pressure for pumping a nutrient containing aqueous fluid to the various mist nozzles. Alternatively, Nir provides for the spraying of tap water from a water tap. However, such tap water spray does not include nutrients, hormones or the like.

OBJECTS AND SUMMARY OF THE INVENTION

Objects of the Invention

It is the principal object of the present invention to provide an improved method and apparatus for propagating plant cuttings under aeroponic conditions by the intermittent application to root portions thereof of an aqueous, nutrient and hormone plant growth promoting hydro-atomized mist.

A related object is to provide an aeroponic plant propagating method and apparatus which utilizes standard tap water pressure and a simple timed valve system, without requiring expensive high pressure pumps or air pressure and the like for introducing nutrients, hormones, and other plant growth promoting compositions into the propagating chamber as a hydro-atomized mist.

Another object of the present invention is provide a method and apparatus of the foregoing character by means of which an aqueous based plant growth composition can be introduced into the propagating chamber as a mist by utilizing standard tap water pressure and a simple liquid suction venturi for introducing and mixing the growth promoting components into an aqueous medium.

A further object of the present invention is to provide a propagating chamber in which a plurality of orifices are provided for supporting cuttings in position for rooting and which allow for subsequent removal of the cuttings and roots thereon without injury to the plants.

A further object of the present invention is to provide a method and apparatus which is adaptable both to commercial greenhouse and domestic home use conditions.

A further object of the invention is to provide a system which shortens propagation time, increases plant survival, and produces a healthier plant using less space than currently applied techniques.

Still a further object of the invention is to provide a method and apparatus which produces a spray mist of water and plant growth composition solution using a fluid venturi suction device without the use of a pneumatic or pressure injection of the solution through the mist nozzles.

A further object of the invention is to provide a simple yet rugged housing providing the desired environmental chamber, which housing can be readily opened to permit inspection of the propagating plants.

Other objects and advantages of the present invention will become apparent from the following description of the preferred embodiment of the invention.

Summary of the Invention

The present invention is embodied in an aeroponic plant propagating apparatus formed by a chamber having upper and lower sections and incorporating in the lower section a plurality of mist forming spray nozzles and having in the upper section a plurality of apertures through which cuttings may be inserted for purposes of subjecting the portions of the cuttings within the chamber to an aqueous plant growth composition containing hydro-atomized mist. The apertures are formed as upwardly projecting, annular plant supporting cylinders defining a smoothly rounded or curved edge with the top panel of the upper chamber. When plants are removed from the apertures after rooting, the smoothly rounded edges prevent the tearing and damage of newly formed roots. At the same time, the upwardly projecting elements of the cylinders support the plant cuttings for propagation.

An aqueous nutrient, hormone, or other plant growth promoting composition containing mist is provide by means of a venturi suction device connected to a source of tap water at standard tap pressure. The suction conduit from the venturi extends into a container of a nutrient, hormone or plant growth composition solution, which is drawn up into the water line by suction induced by the flow of tap water through the venturi. The aqueous solution thus formed is then directed to a manifold from which it is sprayed out of the nozzles in the form of a fine mist.

Because a venturi requires a certain pressure and flow in order to provide the desired suction, and because a mist forming nozzle creates a substantial back pressure, means must be provided for effecting the suction action of the venturi while at the same time providing for a mist spray. Such an aqueous mist spray may be characterized as a hydro-atomized mist. While the formation of a fine mist has conventionally been accomplished with a high pressure pump, it has been discovered that tap water, at standard tap pressure may be utilized by first draining the system between the venturi and mist spray nozzles. The flow of water under tap pressure to refill the system is effective to draw a measured amount of nutrient, hormone or other solution from a source thereof into the water line between the venturi and the mist nozzles. The aqueous plant growth promoting composition, such as a nutrient and hormone containing solution, is then sprayed out of the nozzles in the form of a very fine mist. After a measured or predetermined length of time, the flow of tap water is shut off and the system drained. The cycle is then repeated. In this manner, an intermittent aqueous nutrient spray can be provided to the interior of the chamber in the form of a very fine mist for promoting the propagation of roots on cuttings suspended therein.

A three-stage timer mechanism is provided which controls the operation, through solenoid actuating mechanisms, of both the main shut-off valve in the tap water line, and a drain valve in the venturi and growth composition section of the system. By cycling these valves, the system can be alternately drained and refilled with plant growth propagating solution through the suction action of the venturi unit.

DESCRIPTION OF THE DRAWINGS

FIG. 1 is a perspective view of a plant propagating apparatus embodying the present invention.

FIG. 2 is a perspective view of a plant propagating apparatus of the type shown in FIG. 1, but with the housing sections separated to permit viewing of the interior thereof.

FIG. 3 is a top plan view of the apparatus shown in FIG. 1.

FIG. 4 is a section view taken substantially in the plane of line 4—4 on FIG. 3.

FIG. 5 is an elevation view of the apparatus shown in FIG. 1.

FIG. 6 is a section view taken substantially in the plane of line 6—6 on FIG. 5 and showing a plan view of the bottom section of the apparatus shown in FIG. 1.

FIG. 7 is a schematic piping diagram, partly in section, of the water and nutrient supply and spray mist system embodying the present invention.

FIG. 8 is an electrical diagram of the electrical control system for the piping system shown in FIG. 7.

DESCRIPTION OF THE PREFERRED EMBODIMENT

Referring to the drawings, the present invention comprises a plant propagation or rooting chamber 20, formed with an upper section or cover 21 and a lower section or pan 22. Tap water, at standard or common tap pressure, is supplied to the system through a hose or conduit 24 connected to a control and venturi unit 25 mounted on the exterior of the lower chamber section 22. Nutrients, hormones and like plant growth promoting compositions are supplied to the unit 20 through the control unit 25 from one or more appropriate source containers 26, 28 thereof. Supported interiorly of the lower chamber section 22 is appropriate piping leading from the control unit 25, in the form of a manifold pipe 29 supporting one or more manifold branch pipes 30 extending generally laterally of the chamber and provided with appropriate mist nozzles 31. The manifold pipe 29 extends through the lower section and out of the opposite end where it is provided with an appropriate cap (not shown), and is thereby supported in the lower chamber section 22.

The side and end walls 32 and 34 of the chamber sections 21, 22 are sloped both to provide for the flow of excess moisture as well as to enable the sections to be nested one within the other for storage or shipping. Appropriate reinforcing ribs 35 may likewise be provided to strengthen or stiffen the side panels 34. The chamber 20 may be formed of any appropriate material such as a high impact plastic.

For supporting plant cuttings for propagation, such as rooting, the top panel 36 of the upper section 21 is provided with a plurality of apertures 38 defined by upwardly extending annular cylinders 39 joined to the top wall panel 36 by smoothly curved fillet 40 having a relatively large radius. As cuttings having newly formed root growth thereon are removed from the apertures 36, the radius of the fillets 40 prevents the edges of the aperture from tearing or injuring the tender root growth. The upwardly extending cylindrical projections 39 defining the apertures 38 further help to preclude the entrance of contaminants or unwanted materials into the interior of the chamber, and at the same time support the cuttings with the growth portion extending into the chamber interior.

The upper and lower sections 21, 22 meet and are retained together as shown in FIG. 1 by the provision of a peripheral channel on the lower section walls formed by a horizontally extending lip 42 on the upper edge of the lower section 22 and having an upwardly extending rim 44 therearound which defines an open channel adapted to receive the lower edge 45 of the top section. Such a channel structure further facilitates the opening of the chamber by tipping the top section 21 relative to the bottom section 22 to permit inspection of the contents. The upwardly extending lip 44 prevents the top 21 from slipping off the lower section 22, and thereby injuring or destroying plant cuttings supported therein. Appropriate drain apertures 48 and conduits may be provided in the bottom section as needed.

For purposes of providing an intermittent aqueous nutrient, hormone, fertilizer or other plant growth composition containing, hydro-atomized mist to the interior of the rooting chamber, an appropriate tap water supply and composition feed piping system is provided, as shown in FIG. 7, together with an electrical solenoid control system, as shown in FIG. 8. Turning first to the piping system, the tap water supply hose 24 is connected through a solenoid actuated main valve 51 and check valve 52 to a venturi unit 54. The outlet of the venturi 54 is connected to the main rooting chamber manifold 29 and thereby to the headers 30 and mist nozzles 31.

Plant growth compositions, such as nutrient and rooting hormone solutions are supplied from containers 26 and 28 which are connected, by appropriate conduits, through a check valve 55 to the venturi suction port 56. A venturi drain port 58 is connected through a solenoid actuated purge valve 59 to an outlet or drain conduit 60 which may lead to the bottom of the rooting chamber 20 or may lead directly to a drain. It should be noted that the containers of nutrient and/or hormone must be positioned below the venturi 54 or a siphoning or drain of nutrient or hormone will occur with every purge, resulting in the loss of the valuable composition.

The venturi 54 is a conventional venturi type suction unit which comprises a housing 61 defining a relatively large inlet chamber 62 opening through a throat or orifice 63 into a relatively smaller suction chamber 64, which is in turn connected to the outlet port 65 of the venturi and to the suction port 56. One useful venturi unit is manufactured commercially by Hyponex Company, Inc. and is shown in U.S. Pat. No. 2,215,132.

Alternate actuation of the main valve 51 and the purge valve 59 within the overall time cycle, periodically drains the venturi and downstream piping system, and subsequently refills the venturi and piping system with nutrient or rooting hormone solutions which are sucked into the venturi and thence into the piping system for atomized misting in the rooting chamber. To drain the system, the solenoid actuated main valve 51 is closed and the solenoid actuated purge valve 59 is opened. This allows all liquid to drain from the venturi 54 and downstream system including the manifold 29. After the liquid has drained from the system, the purge solenoid is deenergized and the purge valve 59 is closed. Following time duration, a predetermined main solenoid is energized to open the main valve 51. Water flows through the venturi 54 into the rooting chamber piping system, and the venturi 54 operates to draw nutrient, hormone or other solutions into the water stream. The aqueous plant growth, nutrient or rooting hormone solution is then sprayed as a fine hydro-atomized mist through the spray nozzles 31. After a measured period of time, during which the pressure in the system builds up to full tap pressure, the main valve of 51 is again closed and the purge valve 59 opened to drain the system, and the cycle is continuously repeated.

For effecting the cycling, a time switch, in the form of a 3-stage timer switch 70 is provided which includes a timer 71 which actuates a main valve solenoid switch 72 and a purge valve solenoid switch 74. The first timer stage provides an overall time duration cycle of about 2.5 minutes. The second stage provides a surge cycle of about 12 seconds, which is actuated within the time duration cycle at the beginning of the total cycle. The third stage is the purge cycle, which is about 40 seconds long, and is activated within the time duration cycle directly following the surge cycle. These cycles can be variable increment cycles and the manipulating of these cycle durations provides the desired means for determining nutrient venturi uptake. The main valve solenoid 75 is connected to the main valve 51 while a purge valve solenoid 76 is connected to the purge valve 59. A main switch 78 turns the system on, electrical power being provided from a conventional 110 volt source 79 through a step down transformer 80. Additionally, a main solenoid switch 81 and a purge solenoid switch 82 are provided for energizing the respective solenoids to open the valves independently of the timer. In this manner water alone can be sprayed or the entire system can be drained as desired.

In operation, plants are sprayed in a timed mist cycle using a short pulse or interval of water pressure. A time cycle duration holding the main valve open for about 12 seconds allows for a velocity sequence of a venturi suction of nutrient or hormone of about 7 seconds before water pressure builds at the mist jet heads causing a venturi back flow, resulting in an actual misting pressure for a duration of about 5 seconds. At this point, the main valve 51 closes and the purge valve 59 opens for about 40 seconds, sufficient to allow the system an incremental drain period within which line gravity drains the system via appropriate drain conduits. The incremental time duration of the venturi suction determines the quantity of nutrient or hormone delivered to the mist jet heads. This can be easily determined and controlled. The system provides an extremely fine high pressure atomized mist of water and nutrient or hormone solution in a short pulse application.

Following the misting and purge cycle there is then a "wait cycle" in the overall time duration cycle. By utilizing this wait period the process is incrementally spaced over a predetermined time period, the wait period being as important as the spray period.

The system is particularly effective for the rooting propagation of plants from cuttings. The system functions on a short pulse spray duration which keeps the cuttings from drying out and yet provides the necessary nutrient and hormone balance to effect rapid propagation. While the system requires constant water pressure from a standard tap source, an intermittent hydro-atomized mist spray is provided to the plants.

The nutrient mist is applied through two or more mist orifices or nozzles 31 per rooting chamber. While the rooting chamber is preferably opaque, it need not be air tight. The unit functions at standard atmospheric pressure. Any appropriate number of orifices or nozzles 31 may be provided depending on the number of cuttings to be propagated at one time.

While a certain illustrative embodiment of the present invention has been shown in the drawings and described above in considerable detail, it should be understood that there is no intention to limit the invention to the specific form disclosed. On the contrary, the intention is to cover all modifications, alternatives, constructions, equivalence and uses falling within the spirit and scope of the invention as expressed in the appended claims.

We claim:

1. An apparatus for applying an intermittent aqueous atomized mist composition to plants, including an enclosed chamber, means for supporting plant cuttings with a propagation portion thereof extending into said chamber, and means for intermittently applying an aqueous nutrient mist composition to said plants, comprising a supply of water at tap water pressure, means for controlling the flow of water from said supply, a distributing manifold including a plurality of mist forming nozzles positioned in said chamber, a source of plant growth promoting composition, a suction venturi positioned above and in communication with said growth promoting composition for introducing said plant growth promoting composition into said water from said supply before said water is introduced into said distributing manifold, means for draining water from said distributing manifold and venturi unit, and means for actuating said water control means and said drain means in an intermittent timed sequence for periodically stopping flow of said water, draining said suction venturi and distributing manifold; and thereafter initiating flow of said water from said supply and a flow of said growth composition from said source through said venturi to form an aqueous growth composition and introducing said aqueous growth composition into said distributing manifold and thence into said chamber as a fine mist for application to said plants, and repeating said time sequence.

2. A method for propagation of plants comprising the steps of directing a fine hydro-atomized mist of aqueous plant growth composition onto a portion of said plants in an enclosed chamber through a system including a suction venturi receiving water at tap water pressure, a distributing manifold, and mist nozzles; stopping the flow of said aqueous composition and draining said suction venturi and distributing manifold; thereafter starting the flow of said composition through said system whereby the flow of water through said suction venturi introduces additional plant growth composition into said water for application as an aqueous plant growth composition mist to said plants and periodically repeating said steps thereby to provide an intermittent aqueous plant growth composition mist to said plants for promoting growth thereof.

3. The invention as defined in claim 1, wherein said means for supporting plant cuttings has a portion thereof subjected to an intermittent mist of aqueous plant growth promoting composition, said chamber including an upper horizontal panel having a plurality of apertures therethrough for receiving plant cuttings, wherein the improvement comprises means defining a plurality of plant cutting supporting members on said panel forming said apertures, each of said members being defined by an upwardly directed annular cylinder defining a central aperture opening through which a plant cutting is inserted, each said cylinder having an upper rim for supporting the plant cutting, and means defining a smoothly rounded interior edge between said cylinder and said panel for facilitating withdrawal of plant cuttings without damaging tender rootings thereon.

4. A method of forming a mist of an aqueous additive composition formed from water at tap water pressure and an additive solution by mixing said water and said solution in a suction venturi and distributing manifold, and spraying said composition as a mist through mist nozzles, comprising the steps of directing a flow of said water to said venturi and manifold, stopping the flow of said water, draining said suction venturi and distribution manifold, and thereafter re-initiating flow of said water at tap water pressure through said venturi to draw additive composition from a supply thereof for mixing with said water in said suction venturi and said distribution manifold prior to discharge through said mist nozzles, and repeating said steps to provide an intermittent mist flow of said aqueous additive composition.

5. The method defined in claim 2 wherein the overall time cycle is about two and one-half minutes, the spray stage is of a duration of about twelve seconds, and the drain stage is of a duration of about forty seconds.

* * * * *